INVENTOR
ALBERT S. MICHELSON

BY Ely & Barrow

ATTORNEYS

Patented May 7, 1935

2,000,406

UNITED STATES PATENT OFFICE 2,000,406

VULCANIZER

Albert S. Michelson, Akron, Ohio, assignor to National Rubber Machinery Company, Akron, Ohio, a corporation of Ohio Application August 2, 1933, Serial No. 683,241

7 Claims. (Cl. 18—17)

This invention relates to vulcanizers, and more especially it relates to vulcanizers of the individual, watchcase type such as are used for the vulcanizing of tire casings, inner tubes and the like.

In vulcanizers of the character mentioned it is common practice to provide mechanical means for locking the vulcanizer sections together, and fluid pressure means operating over a large area of one of the said sections for forcing it against the other section to assure complete and uniform closure of the sections throughout. In vulcanizers for tires and tubes of large cross-sectional diameter and small inside diameter it is preferable that the mechanical locking means be located exteriorly of the vulcanizer rather than at the axis thereof, and it is to improvement in this type of locking mechanism that this invention primarily is directed.

The chief object of the invention is to provide improved means for locking together the two sections of a watchcase vulcanizer. More specifically the invention aims to provide vulcanizer locking means adaptable for locking vulcanizer sections containing molds of various thicknesses. A further object is to provide for obtaining accurate registry of the elements of the vulcanizer locking mechanism. Other objects will be manifest.

Of the accompanying drawings.

Figure 1:
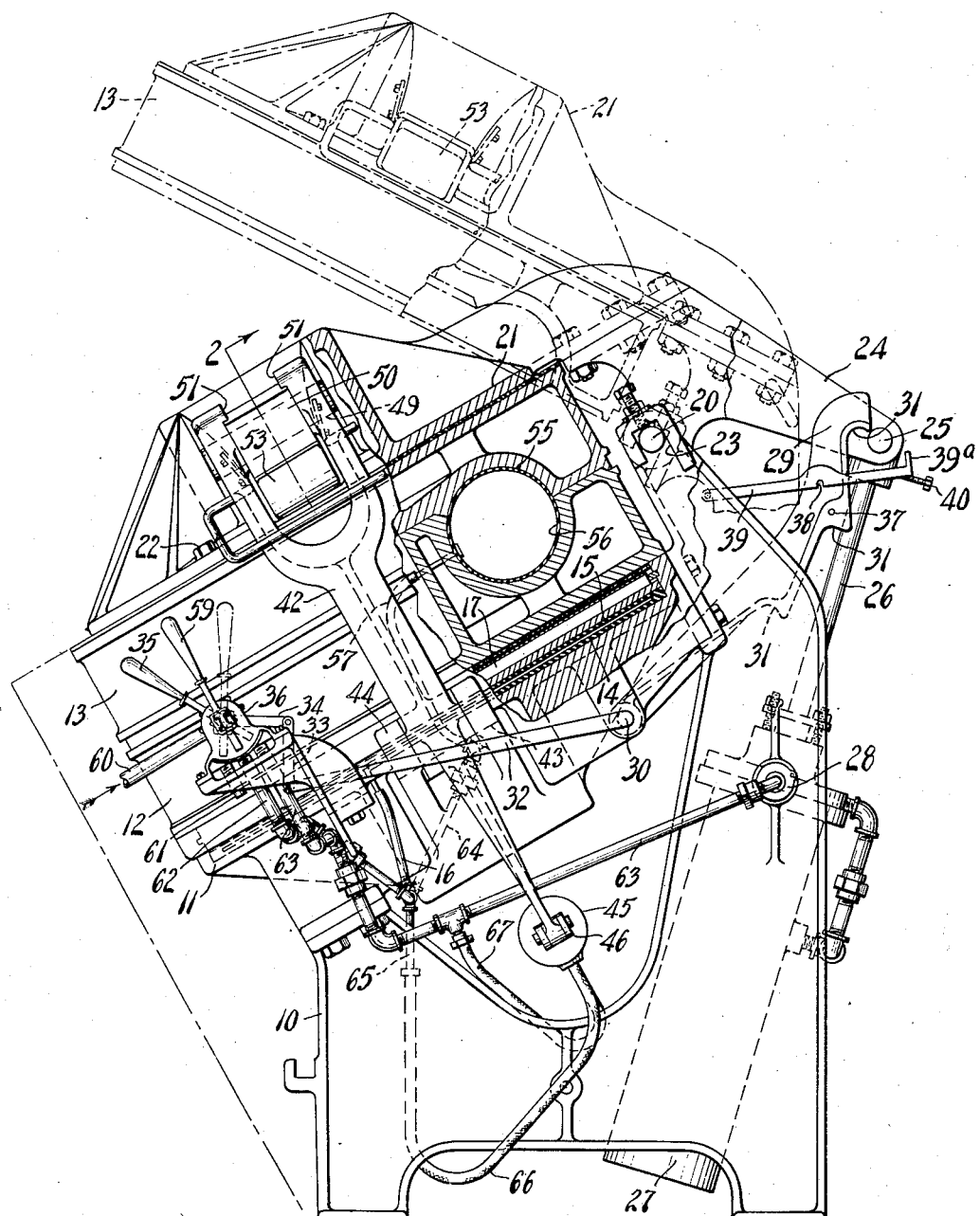
Figure 1 is a side elevation of a vulcanizer embodying the invention, in its preferred form, a part thereof being broken away and in section.

Referring to the drawings, 10, 10 are a pair of spaced apart supports or legs upon which is mounted an annular bed or base 11 that carries the lower section 12 of a two part mold comprising mold sections 12, 13, the base 11 being arranged at an angle to the supports 10 for convenience in mounting and removing work from the mold, and for removing water of condensation from the steam jackets of the mold. The base 11 is formed in its top face with a concentric annular chamber or recess 14 in which is mounted an inflatable, distensible, bag 15 of rubber, said bag being supplied with pressure fluid through a pipe 16 that is connected with a suitable source of pressure fluid as subsequently will be described. A suitable spacing and insulating structure 17 is positioned between the bag 15 and lower face of mold section 12 to prevent heat of the latter from deleteriously affecting the bag 15. The mold section 12 is mounted in a known manner on base 11 to permit limited axial movement of said mold section relatively of the base, the arrangement being such that when the vulcanizer is closed, inflation of the bag 15 will force the lower mold section 12 firmly into engagement with mold section 13 throughout their mating surfaces.

At the rear of the vulcanizer the legs 10 extend upwardly and between them carry a hinge pin 20 that is positioned substantially in the parting plane of the mold sections 12, 13. Pivotally mounted upon the hinge pin 20 is an upper platen 21 to which the upper mold section 13 is secured by bolts, such as the bolt 22. The pivotal mounting of the platen 21 includes an open-end slot 23 in which the hinge pin 20 is received, the arrangement being such that the platen may be lifted off the hinge pin, upon occasion, by upward movement of the mold sections induced by inflation of the bag 15. The upper platen structure comprises a rearwardly extending lever arm 24 that is pivotally connected by pin 25 at its free end to the outer end of the piston rod 26 of a fluid pressure operated cylinder 27, the latter being pivotally mounted at 28, at its upper end, between the supports 10. The cylinder 27 is single acting and adapted, when charged, to raise the upper platen 21 to the position shown in broken lines in Figure 1, the platen being lowered by gravity when the cylinder is discharged.

To prevent the platen 21 when raised from moving suddenly downwardly in the event of leakage or failure of the fluid pressure in cylinder 27, safety means comprising a latch 29 is provided, said latch being mounted upon a rock shaft 30 that suitably is journaled in base member 11, and being formed with a series of marginal notches 31, 31 adapted to engage with a projecting end portion of pin 25 in various positions of the latter. The rock shaft 30 is operated by an elongate lever 32 that extends toward the front of the vulcanizer, and has its free end connected by a link 33 to a lever 34 associated with a safety handle 35 constituting a part of a fluid-control valve 36 presently to be described. Near its free end the latch 29 is provided with a projecting stud 37 engageable in a notch 38 formed in a safety catch 39, the latter being pivotally mounted on a support 10 and having an angular extension 39ª on its free end that extends into the path of a stud 40 projecting from the end portion of piston rod 26. When the vulcanizer is in the closed position shown in Figure 1, the latch 29 rests against the pin 25 as shown, and during the opening of the vulcanizer the said pin ratchets past the several notches 31 of the latch whereby the latter is in position to prevent falling of the upper platen in the event of failure of the cylinder 27. To close the vulcanizer, the handle 35 is operated to lift the latch 29, whereupon the stud 37 is engaged in notch 38 of catch 39, the latter then supporting the latch until the stud 40 of the outwardly moving piston rod 26 engages extension 39ª of catch 39 to release the catch from the latch stud 37, permitting the latch once again to drop against pin 25 as shown.

Figures 2, 3:
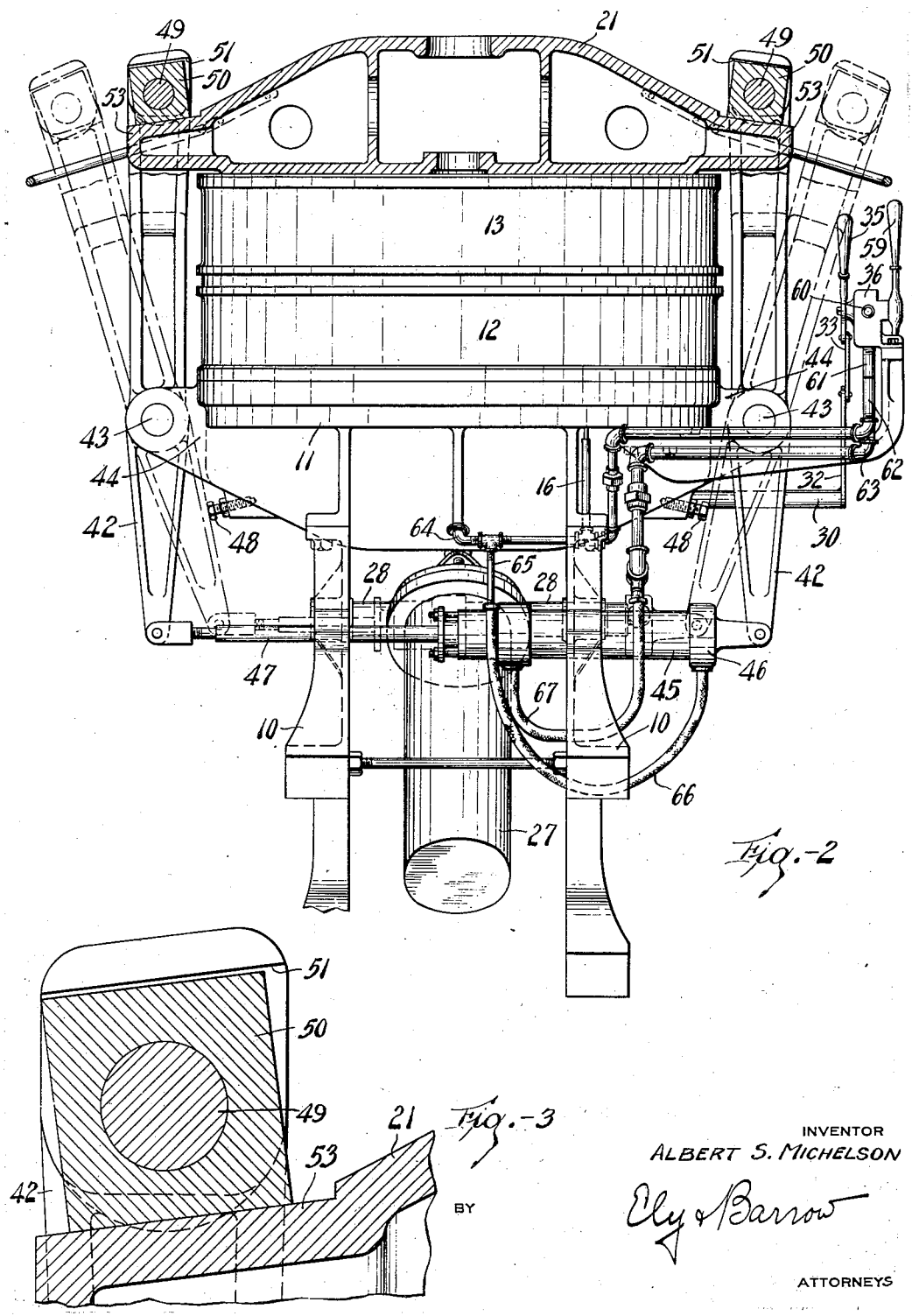
Figure 2 is a section on the line 2—2 of Figure 1.
Figure 3 is a sectional detail, on a larger scale, of a portion of the apparatus shown in Figure 2.

For locking the vulcanizer in closed position during vulcanizing operations, a pair of locking arms 42, 42 are provided, said locking arms being centrally pivoted at 43, 43 upon suitable respective brackets 44 formed on the base member 11 at opposite sides thereof. The upper, free ends of the locking arms 42 are moved toward and away from the platen 21 by means of a double-acting fluid pressure operated cylinder 45 that has its rear head 46 pivotally connected to the lower end of one of the locking arms 42 and has its piston rod 47 pivotally connected to the lower end of the other locking arm 42. The locking position of the locking arms is shown in full lines in Figure 2, and the unlocked position of the arms is shown in broken lines. Adjustable stops 48, 48 are provided for limiting the movement of the locking arms away from the platen 21. The upper end portions of the locking arms 42 are forked, and pivotally mounted in said forks, on respective pins 49 therein, are respective wedging blocks 50. The latter are square in section, and each is so arranged with respect to its pivot pin 49 that each of its four lateral faces is a different distance from the axis of the pin, as may be seen with reference to Figure 3. There is a lip 51 on the end portion of each fork of each arm 42, which lips overhang the wedge block 50, in spaced relation thereto, the arrangement permitting limited pivotal movement of the wedging blocks 50 on their pivot pins 49.

The upper platen 21 is formed with heavy, bracket-like lugs 53, 53 projecting laterally from opposite sides thereof, the upper faces of said lugs being somewhat tapered or sloped downwardly. The wedging blocks 50 engage the sloped faces of the lugs 53 with a wedging action in the closed or locked condition of the vulcanizer, the pivotal mounting of the wedging blocks enabling them to seat flat on the lugs under all conditions. The vulcanizer is adapted for use with any number of molds, which are interchangeable with each other, and if, due to inaccurate machining, some molds are of slightly different thickness than others, the wedging blocks 50 may be turned so as to present different faces to the lugs 53 so that proper wedging action will be obtained.

Steam-jacket molds for vulcanizing various articles may be used with the vulcanizer, the mold shown having an annular cavity 55 for the molding of an inner tube 56, the latter being inflated during vulcanization by means of air conducted to the valve stem of the tube through a flexible pipe 57.

The operation of opening and closing the vulcanizer, conducting pressure fluid to and from the inner tube 56, and operating the locking arms 42 are effected in timed relation to each other by means of the valve 36 and suitable piping connected therewith. The valve 36 is a four-way valve having an operating handle 59, a fluid inlet pipe 60 extending to a source of fluid pressure (not shown), an exhaust port 61, and two delivery pipes 62, 63. The pipe 62 branches three ways, one branch, 64, being connected to flexible pipe 57 to the work, another branch 65, being connected to a flexible pipe 66 extending to the rear end of cylinder 45, and a third branch consisting of pipe 16 to the expansible bag 15. The pipe 63 extends to the upper end of cylinder 27, having communication therewith through one of its pivotal mountings 28. A flexible pipe 67 branches off pipe 63 and extends to the front end of cylinder 45.

In Figure 1 the valve 36 is shown in neutral position in which case the inlet pipe 60 is closed off and delivery pipes 62, 63 are in communication with exhaust port 61. When the operating handle is in forward position, in alignment with handle 35 as shown in Figure 1, fluid pressure is delivered through pipe 63 to the cylinder 27 to lift the upper platen 21 to open the vulcanizer, and also is delivered through pipe 67 to the front end of cylinder 45 to disengage the upper ends of locking arms 42 from the platen lugs 53. Because of the smaller volumetric capacity of cylinder 45, it is actuated to unlock the vulcanizer before the cylinder 27 operates to open it. When the handle 59 is in the rearward, broken line position shown in Figure 1, pipe 63 is in communication with exhaust port 61, and fluid is delivered into pipe 62 whence it passes through pipes 65, 66 to cylinder 45 to lock the vulcanizer in closed position, through pipe 16 to distend the bag 15 and thus press the mold sections together, and through pipes 64, 57 to the work 56 in the mold cavity to distend said work against the walls of said cavity. The mold sections are constantly heated so that vulcanization of the work is effected with the valve 36 in this position. It is desirable that the locking arms 42 do not disengage the lugs 53 when there is pressure in the work 56, such as might occur if the valve controlling the inflation of said work becomes clogged or disabled. To this end the resistance of the friction of the locking blocks 50 with lugs 53 under the internal pressure in the work may be greater than the pressure applicable by cylinder 45 can overcome. This may be accomplished by using only sufficient pressure on cylinder 45 to open the locking means when the same are free of the internal pressure to prevent unlocking of the press until the internal pressure is released. Failure of the press to open for this reason would be found upon inspection and can be cured by blowing additional fluid into the tire to clear the valve of an obstruction or by otherwise fixing the tire inflating valve. Thus injury to the vulcanizer, the work or workman may be avoided.

The vulcanizer is simple in construction and operation and achieves the several objects set out in the foregoing statement of objects. The feature of providing a handle 35 for the latch 29 requires that the operator's left hand be engaged while the handle 59 is moved rearwardly to effect closing of the vulcanizer, so that the possibility of closing the vulcanizer on the left hand of the operator is avoided.

Modification may be resorted to without departing from the spirit of the invention or the scope of the appended claims.

What is claimed is:

1. In a vulcanizer, the combination of a pair of relatively movable vulcanizer sections, means for relatively moving said sections to open and close the vulcanizer, and means for locking said sections in closed position, said means comprising a pivotally mounted locking arm on one of said sections, and a pivotally mounted wedge-block on one end of said arm adapted to engage an inclined surface on the other vulcanizer section.

2. In a vulcanizer, the combination of a pair of relatively movable vulcanizer sections, means for relatively moving said sections to open and close the vulcanizer, and means for locking said sections in closed position, said means comprising a locking arm pivotally mounted on one of said sections, and a wedge-block mounted in the free end of said locking arm adapted to engage an inclined surface on the other vulcanizer section, said wedge block being adjustable to vary the effective length of the locking arm.

3. In a vulcanizer, the combination of a pair of relatively movable vulcanizer sections, means for moving said sections to open and close the vulcanizer, and means for locking the said sections in closed position, said means comprising a locking arm pivotally mounted on one of said sections, a wedge-block pivotally mounted in the free end of said arm adapted to engage an inclined surface on the other vulcanizer section, and means for limiting angular movement of the wedge block on its pivot.

4. In a vulcanizer, the combination of a pair of relatively movable vulcanizer sections, means for moving said sections to open and close the vulcanizer, a locking arm pivotally mounted on one of said sections, and a wedge-block mounted in the free end of said arm adapted to engage an inclined surface on the other vulcanizer section, said wedge-block having a plurality of operative surfaces adapted selectively to be disposed in operative position to vary the effective length of the locking arm.

5. In a vulcanizer, the combination of a pair of relatively movable vulcanizer sections, means for moving said sections to open and close the vulcanizer, and means for locking the vulcanizer in closed position, said means comprising a locking arm pivotally mounted on one of said sections, a pin carried by the free end of said arm, and a wedge-block, polygonal in cross section, eccentrically mounted on said pin, said wedge-block being adapted to engage an inclined surface on the other vulcanizer section.

6. In a vulcanizer, the combination of a pair of relatively movable vulcanizer sections, means for relatively moving said sections to open and close the vulcanizer, and means for locking the vulcanizer in closed position, said means comprising a locking arm pivotally mounted on one of the sections, a pivot pin carried by the free end of said arm, a wedge-block of polygonal cross section eccentrically journaled on said pivot pin, said block being adapted to engage an inclined surface on the other vulcanizer section alternatively with its several faces, and means for limiting the angular movement of the wedge-block on its pivot pin during the locking of the vulcanizer.

7. A combination as defined in claim 6 in which the means for limiting the angular movement of the wedge-block on its pivot is a lip that is formed on the locking arm and overlies one of the faces of the wedge-block in close proximity thereto.

ALBERT S. MICHELSON.